United States Patent
Eriksen et al.

(10) Patent No.: US 9,541,069 B2
(45) Date of Patent: Jan. 10, 2017

(54) NACELLE SHELL STRUCTURE, LOCK LABYRINTH AND WIND TURBINE

(75) Inventors: Uffe Eriksen, Horsens (DK); Jens Markussen, Torring (DK); Thorkil Munk-Hansen, Give (DK); Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1102 days.

(21) Appl. No.: 13/511,473

(22) PCT Filed: Sep. 16, 2010

(86) PCT No.: PCT/EP2010/063641
§ 371 (c)(1),
(2), (4) Date: Dec. 13, 2012

(87) PCT Pub. No.: WO2011/064006
PCT Pub. Date: Jun. 3, 2011

(65) Prior Publication Data
US 2013/0084177 A1    Apr. 4, 2013

(30) Foreign Application Priority Data
Nov. 25, 2009   (EP) .................................... 09014701

(51) Int. Cl.
*F03D 13/20*      (2016.01)
*F03D 11/04*      (2006.01)

(52) U.S. Cl.
CPC .............. *F03D 11/04* (2013.01); *F03D 13/20* (2016.05); *F03D 80/00* (2016.05); *F05B 2230/60* (2013.01);
(Continued)

(58) Field of Classification Search
CPC ....... F03D 11/00; F03D 11/04; F05B 2230/60; F05B 2240/14; F05B 2240/57; F05B 2260/95; Y02E 10/722; Y02E 10/726
(Continued)

(56) References Cited

U.S. PATENT DOCUMENTS 3,900,116 A * 8/1975 Gehri .................... B65D 57/00
                                                        206/443
4,819,398 A * 4/1989 Dameron ................ E04D 3/362
                                                        52/522
(Continued)

FOREIGN PATENT DOCUMENTS

CN      101326700 A    12/2008
CN      201162631 Y    12/2008
(Continued)

*Primary Examiner* — Ninh H Nguyen
*Assistant Examiner* — Aaron R Eastman

(57) ABSTRACT

A nacelle shell structure which is attachable to a main structure of a wind turbine is described. The nacelle shell structure is attachable to the main structure such that the nacelle shell structure is carried by the main structure at only three static points. Moreover, a nacelle shell structure is provided which is attachable to a main structure of a wind turbine. The nacelle shell structure includes interconnected shell sub-structures. Furthermore, a lock-labyrinth for positioning between a rotating part with a rotation axis and stationary part of a wind turbine is disclosed, which includes a shield structure and a support structure, the shield structure being located radially outward of the support structure and protruding the support structure in axial direction. The shield structure includes a nose protruding radially inward and being located at an axial position where the support structure forms a water-tight channel which opens towards the nose.

15 Claims, 3 Drawing Sheets

(52) U.S. Cl.
CPC ........ *F05B 2240/14* (2013.01); *F05B 2240/57* (2013.01); *F05B 2260/95* (2013.01); *Y02E 10/722* (2013.01); *Y02E 10/726* (2013.01); *Y02P 70/523* (2015.11)

(58) Field of Classification Search
USPC ................... 416/244 A; 415/200, 201, 214.1
See application file for complete search history.

(56) References Cited

U.S. PATENT DOCUMENTS

| | | | | |
|---|---|---|---|---|
| 5,893,395 | A * | 4/1999 | Davis | B21D 13/10 138/112 |
| 2003/0012651 | A1 | 1/2003 | Hacault | |
| 2004/0253093 | A1* | 12/2004 | Shibata | F03D 1/025 415/4.1 |
| 2008/0256892 | A1* | 10/2008 | Franke | E04H 12/08 52/655.1 |
| 2008/0317582 | A1 | 12/2008 | Cassidy | |
| 2009/0169393 | A1* | 7/2009 | Bagepalli | E04H 12/08 416/248 |
| 2009/0191051 | A1* | 7/2009 | Bagepalli | F03D 1/005 415/182.1 |

FOREIGN PATENT DOCUMENTS

| | | |
|---|---|---|
| CN | 101338733 A | 1/2009 |
| CN | 101498285 A | 8/2009 |
| CN | 201292915 Y | 8/2009 |
| DE | 10340560 A1 | 4/2005 |
| DE | 102007003618 A1 | 7/2008 |
| DE | 102007012408 A1 | 9/2008 |
| WO | WO 2007034305 A1 | 3/2007 |

* cited by examiner

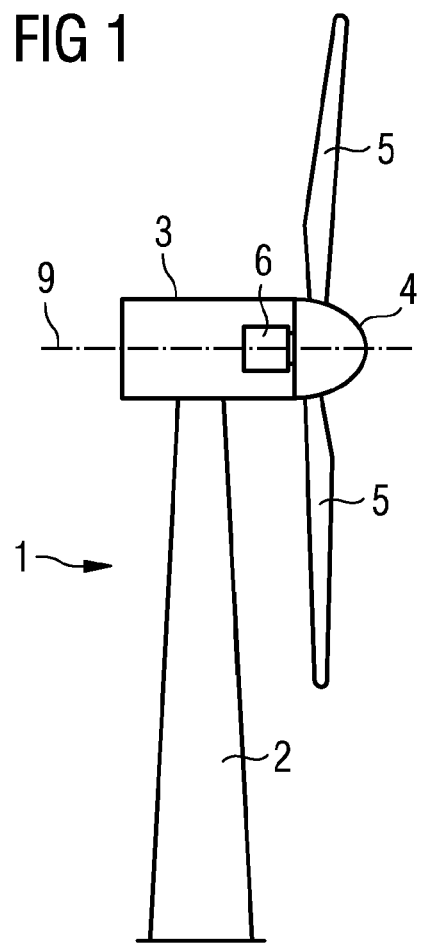
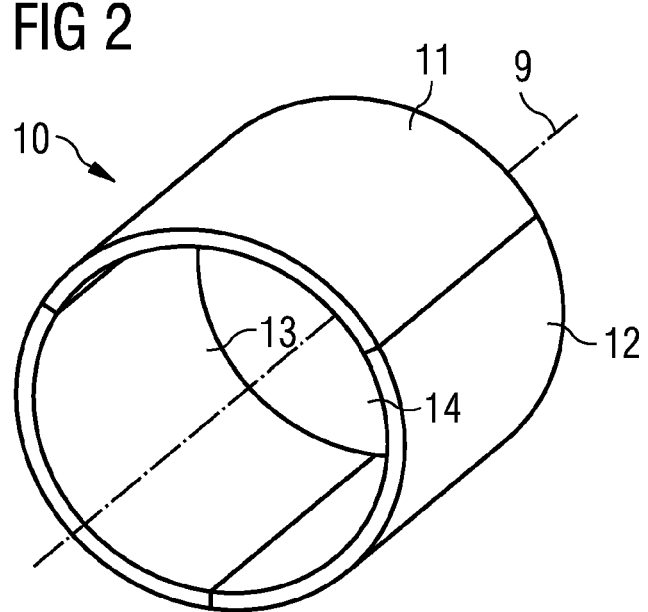

NACELLE SHELL STRUCTURE, LOCK LABYRINTH AND WIND TURBINE

CROSS REFERENCE TO RELATED APPLICATIONS

This application is the US National Stage of International Application No. PCT/EP2010/063641, filed Sep. 16, 2010 and claims the benefit thereof. The International Application claims the benefits of European Patent Office application No. 09014701.8 EP filed Nov. 25, 2009. All of the applications are incorporated by reference herein in their entirety.

FIELD OF INVENTION

The present invention relates to a nacelle shell structure, to a lock labyrinth and to a wind turbine.

BACKGROUND OF INVENTION

A nacelle shell structure usually consists of multiple shell structure elements. The known prior art is to attach each of these nacelle shell elements to a nacelle lattice structure or a nacelle supporting structure e.g. by welding or by screwing the elements to the structure. The lattice structure may be anchored e.g. to a nacelle bedplate.

A difficulty related to this prior art is, that a separate lattice structure has to be build up around the nacelle components in order to hold the shell elements. A further disadvantage is that all vibrations, deformations, stresses etc. are transferred from e.g. the nacelle bedplate to which the lattice structure is anchored and further transferred to the nacelle shell elements. This in turn increases the risk of material fatigue.

SUMMARY OF INVENTION

It is a first objective of the present invention to provide a nacelle shell structure which is attachable to a main structure of a wind turbine, which reduces a transfer of vibrations, deformations or stresses between the main structure and the nacelle shell structure. A second objective of the present invention is to provide a nacelle shell structure which is attachable to a main structure of a wind turbine, which avoids the need of skeletons of lattice structures. It is a third objective of the present invention to provide a lock-labyrinth for positioning between a rotating part and a stationary part of a wind turbine, which prevents dirt or rainwater to enter the interior of the wind turbine. It is a fourth objective of the present invention to provide an advantageous wind turbine.

The first objective is solved by a nacelle shell structure as claimed in the claims. The second objective is solved by a nacelle shell structure as claimed in the claims. The third objective is solved by a lock-labyrinth as claimed in the claims. The fourth objective is solved by a wind turbine as claimed in the claims. The depending claims define further developments of the invention.

In the frame work of the present invention the words nacelle shell and canopy are used synonymously.

The inventive nacelle shell structure is attachable to a main structure of a wind turbine such that the nacelle shell structure is carried by the main structure at only three static points. For example, the nacelle shell structure can be attachable to a wind turbine tower. By constructing the nacelle shell structure such that it is carried by the main structure in substantially three points only, it is possible to build the nacelle shell structure as a static stable construction. This means that the construction is static defined. Stresses from the supporting structure are hereby substantially not or only very minimally transferred to the shell structure which in turn is secured for fatigue.

The three static points may be three physical points. By static points are meant points or areas on the nacelle shell structure or canopy structure which, static wise, can be regarded as one point and between which substantially no static differences are present. This means, that a static stable point may actually be multiple physical points, which are often located close to each other and which can, calculating the static's, be regarded as one point.

For a preferred embodiment, the nacelle shell structure is attached to and carried by the main structure of the wind turbine in substantially three static stable points only. Said three points provide a static stable construction, i.e. a static defined construction. Stresses from the supporting structure are hereby substantially not or only very minimally transferred to the shell structure which in turn is secured for fatigue.

The nacelle shell structure can be directly connectable to the main structure. Alternatively, the nacelle shell structure may be connectable to the main structure by means of at least one sectional bar. Advantageously, the nacelle shell structure can be connectable to the main structure by means of three sectional bars. Each sectional bar can be connectable to one of the static points and to the main structure.

The inventive nacelle shell structure according to the second objective of the present invention is attachable to a main structure of a wind turbine, for example, a wind turbine tower. The nacelle shell structure comprises a number of interconnected shell sub-structures.

The shell sub-structures may be directly connected to each other at a number of connection points. Preferably, the interconnected shell sub-structures may be self-supporting. As the shell structure is built of two or more sub-structures which for various embodiments form a self-supporting shell structure, it is ensured that no or substantially no additional lattice structure are needed for supporting the shell structure. This is cost-effective as only little material is used.

Furthermore, as the nacelle shell structure or canopy is divided into multiple sub-structures it is ensured that the nacelle shell structure or canopy does not have to be transported in one piece and therefore the requirements to transport vehicles etc. is limited. This in turn is also cost-effective.

Moreover, the nacelle shells structure may comprise a flange for supporting the nacelle shell structure and/or for connecting the nacelle shell structure to the main structure of the wind turbine or to a generator. Preferably, the flange may be a circular flange.

The nacelle shell structure may comprise a top sub-structure and/or a side-sub-structure and/or an end-sub-structure. Generally, the sub-structures may be interconnected by means of bolts and screws.

Furthermore, the sub-structures can be single curved. Moreover, the sub-structures may comprise at least one single curved portion. This provides for an easy and cost-effective manufacturing of the needed sub-structures.

Generally, the nacelle shell structure can comprise glass-fibre. Preferably, the nacelle shell structure is reinforced at at least one of the static points.

Generally, all mentioned features can be combined with each other. For example, the nacelle shell structure which is attachable to the main structure such that the nacelle shell structure is carried by the main structure at only three static points, as previously described, may comprise a number of interconnected shell sub-structures, as also previously described.

The nacelle shell structures may be reinforced at the points where it is connectable to the main structure of the wind turbine.

The inventive lock-labyrinths for positioning between a rotating part with a rotation axis and a stationary part of a wind turbine comprises a shield structure and a support structure. The shield structure is located radially outward of the support structure. The radius is related to the rotation axis of the rotating part of the wind turbine. The shield structure protrudes the support structure in axial direction. The axial direction is related to the rotation axis of the rotating part. The shield structure comprises a nose. The nose protrudes radially inward. The support structure comprises a water-tight channel. The water-tight channel opens radially outwards towards the nose. This means, that the nose is located at an axial position where the support structure forms the water-tight channel which opens towards the nose.

The rotating part may comprise a generator. The stationary part may comprise a nacelle or a nacelle shell structure or a nacelle shell sub-structure. Moreover, the lock-labyrinths can comprise a gap between the rotating part and the stationary part.

The described lock-labyrinth provides an environmental barrier between the interior and the exterior of the nacelle shell or canopy. For example, it provides an environmental barrier between the rotating generator and the stationary nacelle shell structure.

A "lock-labyrinth" is created due to the way air, rainwater etc. will have to pass from the exterior in order to reach the interior. If any dirt or water enters the gap between the stationary canopy sub-structure and the rotating shield sub-structure attached to the generator, the first barrier it will meet is the nosing on the shield sub-structure. From here dirt or water will drip to the circular support structure which is formed as a water-tight channel which in turn is designed to lead the collected water and dirt away.

As the lock-labyrinth structures substantially exclude environmental products such as rain water and dirt to enter the interior of the canopy, even though a free air passage is present, it is ensured that components inside the canopy are not exposed to the rain or dirt. This in turn ensures a prolongation of the life-time of the components and a lower fault-rate.

Generally, the previously described nacelle shell structure may comprise an inventive lock-labyrinth.

The water-tight channel can be a circular support structure. In this case, the water-tight channel or circular support structure can be identical to or part of the previously mentioned circular flange of the inventive nacelle shell structure.

The inventive wind turbine comprises a nacelle shell structure as previously described and/or a lock-labyrinth as previously described. For example, the inventive wind turbine may comprise a main structure and a nacelle shell structure. The nacelle shell structure may be directly connected to the main structure. Alternatively, the nacelle shell structure may be connected to the main structure by means of at least one sectional bar. The inventive wind turbine has the same advantages as the inventive nacelle shell structure and/or the inventive lock-labyrinth.

BRIEF DESCRIPTION OF THE DRAWINGS

Further features, properties and advantages of the present invention will become clear from the following description of embodiments in conjunction with the accompanying drawings. All mentioned features and properties are advantageous alone or in any combination with each other.

FIG. 1 schematically shows a wind turbine.

FIG. 2 schematically shows a nacelle shell structure in a perspective view.

Figure 3:
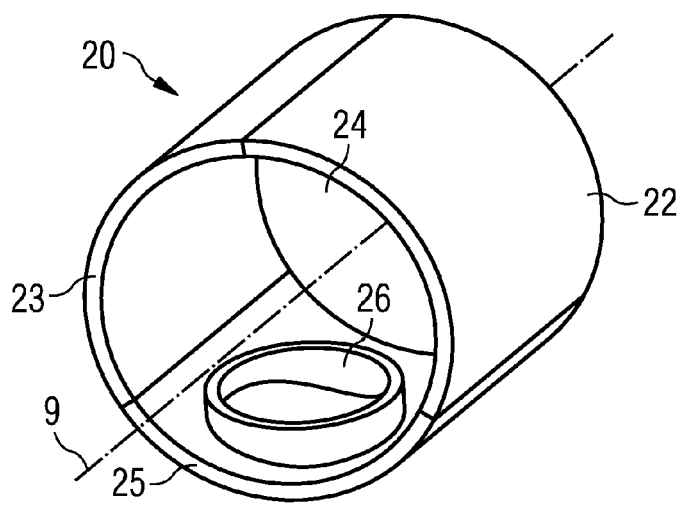
FIG. 3 schematically shows a nacelle shell structure with a circular flange in a perspective view.

A first embodiment of the present invention will now be described with reference to FIGS. 1 to 7.

DETAILED DESCRIPTION OF INVENTION

FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine.

FIG. 2 schematically shows an inventive nacelle shell structure in a perspective view. The nacelle shell structure 10 comprises a top sub-structure 11, a first side sub-structure 12, a second side sub-structure 13 and an end sub-structure 14. The top sub-structure 11 and the two side sub-structures 12 and 13 have a single curved shape.

The side sub-structures 12 and 13 and the top sub-structure 11 are directly connected to each other, for example at a number of connection points or connection faces. The top sub-structure 11 and the two side sub-structures 12 and 13 are connected to each other such that they form a structure with a shape of a hollow cylinder. One of the open sides of the hollow cylinder is closed by connecting the end sub-structure 14 to the top sub-structure and the two side sub-structures 12 and 13, for example by connecting the end sub-structure 14 to the side faces of the top sub-structure 11 and to the side faces of the side sub-structures 12 and 13.

FIG. 3 schematically shows a variant of the nacelle shell structure 20 in a perspective view. The nacelle shell structure 20 comprises two side sub-structures 22 and 23 and a bottom sub-structure 25. It further comprises an end sub-structure 24. The side sub-structures 22 and 23 and the bottom sub-structure 25 have a single curved shape. The side sub-structures 22 and 23 and the bottom sub-structure 25 are connected to each other at a number of connection points or at connection faces. They are connected to each other such that they form a hollow cylinder, as described in conjunction with FIG. 2. The end sub-structure 24 is connected to the side sub-structures 22 and 23 and to the bottom sub-structure 25 in the same way as the end sub-structure 14 in FIG. 2 is connected to the top sub-structure 11 and the side sub-structures 12 and 13.

The bottom sub-structure 25 in FIG. 3 comprises a circular flange 26. The circular flange 26 may be used to attach the nacelle or the nacelle shell structure 20 to another component of the wind turbine 1, for example to the tower 2 or to the generator 6.

Figure 4:
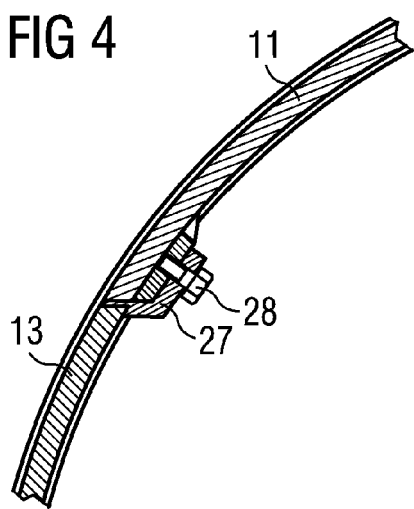
FIG. 4 schematically shows a connection between two shell sub-structures in a sectional view.

FIG. 4 schematically shows a connection between two sub-structures in a sectional view. As an example, FIG. 4 schematically shows a possible connection between the side sub-structure 13 and the top sub-structure 11 of FIG. 2. In FIG. 4 the side sub-structure 13 comprises a male face 27. The male face 27 protrudes the top sub-structure 11 inside of the nacelle shell structure. The portion of the top sub-structure, where the male face 27 protrudes the top sub-structure 11, the top sub-structure 11 has an increased thickness. The male face 27 and the portion of the top sub-structure 11 with an increased thickness are connected to each other by means of a screw 28.

Figure 5:
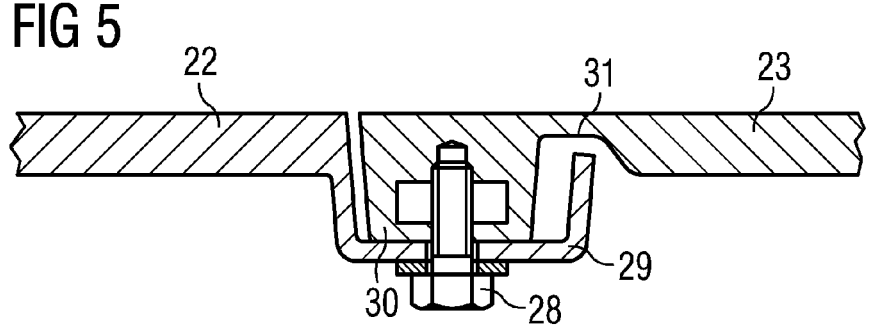
FIG. 5 schematically shows a variant of a connection between two shell sub-structures in a sectional view.

FIG. 5 schematically shows an alternative connection between two sub-structures in a sectional view. As an example FIG. 5 schematically shows a connection between the two side sub-structures 22 and 23 of FIG. 3 at the top of the nacelle shell structure. In FIG. 5 the side sub-structure 22 comprises a male face 29. The male face 29 has an U-shape. The U-shaped male face 29 forms a channel with an opening towards the outside of the nacelle shell structure. The second side sub-structure 23 comprises a male face 30. The male face 30 is formed by means of the portion of the side sub-structure 23 which has an increased thickness. The side sub-structure 23 further comprises a recess 31 or groove-like depression. This recess or groove-like depression 31 forms a channel or a groove with an opening towards the inside of the nacelle shell structure.

The male face 30 of the side sub-structure 23 extends into the opening or channel formed by the male face 29 of the side sub-structure 22. A part of the male face 29 extends into the recess 31. The male face 30 and the male face 29 are connected to each other by means of a screw 28.

Figure 6:
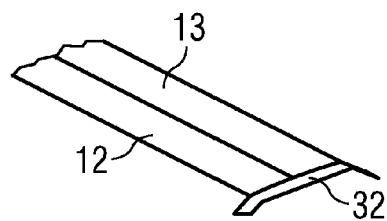
FIG. 6 schematically shows a connection between two sub-structures in a perspective view.

FIG. 6 schematically shows the connection between the two side sub-structures 12 and 13 of FIG. 2 at the bottom of the nacelle shell structure. At the backside, where the two side sub-structures 12 and 13 are connected to the end sub-structure 14, a chamfer for example for leading water and/or dirt out of the nacelle shell structure, if connected to the side sub-structures 12 and 13.

Figure 7:
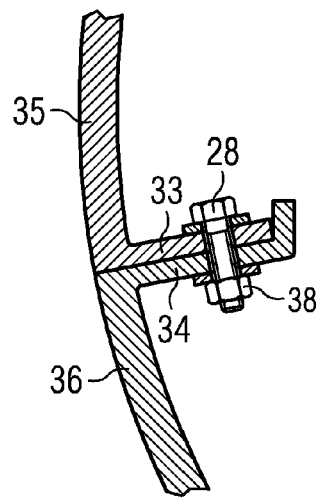
FIG. 7 schematically shows a further variant of a connection between two shell sub-structures in a sectional view.

FIG. 7 schematically shows an alternative connection between two shell sub-structures 35 and 36 in a sectional view. The shell sub-structure 35 comprises a flange 33. The shell sub-structure 36 comprises a flange 34. The shell sub-structures 35 and 36 are connected to each other at the flanges 33 and 34 by means of screws 28 and nuts 38.

All connections described in FIGS. 4 to 7 can be used to connect any of the described sub-structures with any other of the described sub-structures.

A second embodiment of the present invention will now be described with reference to FIGS. 1 and 8.

Figure 8:
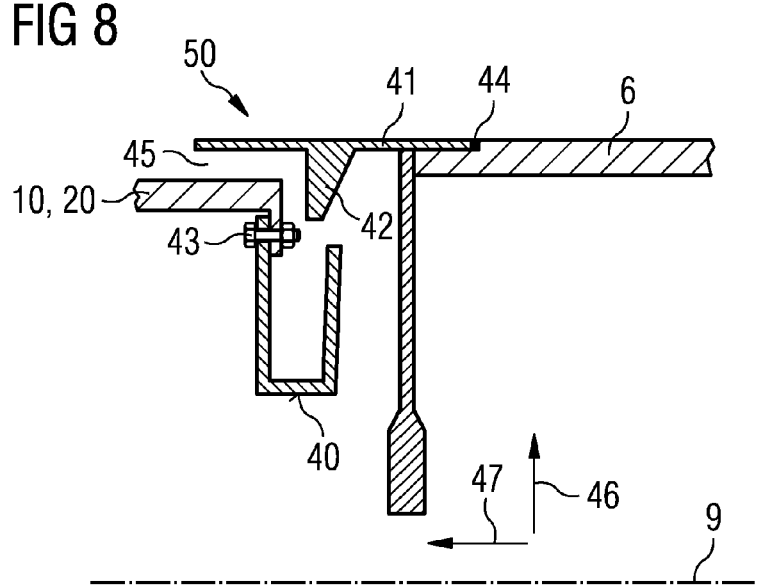
FIG. 8 schematically shows a lock-labyrinth in a sectional view.

FIG. 8 schematically shows an inventive lock-labyrinth in a sectional view. In FIG. 8 the lock-labyrinth 50 is positioned between a generator 6 and a nacelle shell structure 10 or 20. The nacelle shell structure 10, 20 comprises a water-tight channel or circular support structure 40. The water-tight channel or circular support structure 40 is connected to the nacelle shell structure 10, 20 by means of screws and nuts 43. The water-tight channel or circular support structure 40 has an U-shape. The U-shaped structure opens radially outwards. The radial direction is indicated by an arrow 46.

A shield sub-structure 41 is connected to the generator 6. The joint is indicated by the reference numeral 44. The shield sub-structure 41 comprises a nose 42. The nose 42 extends radially inward towards the rotation axis 9. The shield sub-structure 41 protrudes the water-tight channel or circular support structure 40 in axial direction 47. The nose 42 and the circular support structure or water-tight channel 40 are positioned such that the nose 42 has an axial position where it extends towards the inside of the channel formed by the circular support structure or by the water-tight channel 40. This means that the nose 42 protrudes radially inward at an axial position where the support structure forms a water-tight channel 40 which opens towards the nose 42.

The shield sub-structure 41 protrudes the nacelle shell structure 10, 20 such that a gap 45 is located between the shield sub-structure 41 and the nacelle shell structure 10, 20. A water or dirt which enters the gap 45 is led into the water-tight channel 40 by means of the nose 42. The water-tight channel 40 leads the water or dirt out of the nacelle 3. By using the described lock-labyrinth 50 dirt or water, especially rain water can not enter the inside of the nacelle 3.

The invention claimed is:

1. A nacelle shell structure which is attachable to a main structure of a wind turbine, comprising:
   a top sub-structure;
   a first side sub-structure connected to the top sub-structure;
   a second side sub-structure connected to the top sub-structure and to the first side substructure, forming a hollow cylinder;
   an end sub-structure connected to the top sub-structure, the first side sub-structure and the second side sub-structure,
   wherein the nacelle shell structure is attachable to the main structure at only three static points, and wherein said wind turbine further comprises,
   a lock-labyrinth for positioning between a rotating part with a rotation axis and a stationary part of said wind turbine, said lock-labyrinth comprising:
   a shield structure; and
   a support structure,
   wherein the shield structure is located radially outward of the support structure and protruding the support structure in an axial direction,
   wherein the shield structure comprises a nose protruding radially inward and being located at an axial position where the support structure forms a U shaped water-tight channel that opens radially outwards of the support structure; and
   further comprising a gap between the rotating part and the stationary part, wherein water or dirt entering the gap is led into the water-tight channel by the nose.

2. The nacelle shell structure as claimed in claim 1, wherein the nacelle shell structure is directly connectable to the main structure.

3. The nacelle shell structure as claimed in claim 1, wherein the plurality of interconnected shell sub-structures are self-supporting.

4. The nacelle shell structure as claimed in claim 1, further comprising:
   a flange for supporting the nacelle shell structure and for connecting the nacelle shell structure to the main structure of the wind turbine or to a generator.

5. The nacelle shell structure as claimed in claim 1, further comprising:
   a flange for supporting the nacelle shell structure or for connecting the nacelle shell structure to the main structure of the wind turbine or to a generator.

6. The nacelle shell structure as claimed in claim 5, wherein the flange is a circular flange.

7. The nacelle shell structure as claimed in claim 1, wherein the nacelle shell structure further comprises glass-fibre.

8. A lock-labyrinth for positioning between a rotating part with a rotation axis and a stationary part of a wind turbine, comprising:
   a shield structure; and
   a support structure,
   wherein the shield structure is located radially outward of the support structure and protruding the support structure in an axial direction,
   wherein the shield structure comprises a nose protruding radially inward and being located at an axial position where the support structure forms a U shaped water-tight channel that opens radially outwards of the support structure; and
   further comprising a gap between the rotating part and the stationary part, wherein water or dirt entering the gap is led into the water-tight channel by the nose.

9. The lock-labyrinth as claimed in claim 8,
   wherein the rotating part comprises a generator, and
   wherein the stationary part comprises a nacelle or a nacelle shell structure or a nacelle shell sub-structure.

10. The lock-labyrinth as claimed in claim 8,
    wherein the rotating part comprises a generator, or
    wherein the stationary part comprises a nacelle or a nacelle shell structure or a nacelle shell sub-structure.

11. The lock-labyrinth as claimed in claim 8, further comprising a gap between the rotating part and the stationary part.

12. A nacelle shell structure, further comprising a lock-labyrinth as claimed in claim 8.

13. A wind turbine, comprising:
    a lock-labyrinth as claimed in claim 8.

14. The wind turbine as claimed in claim 13, further comprising a main structure and a nacelle shell structure which is directly connected to the main structure.

15. A wind turbine, comprising:
    a main structure:
    a nacelle shell structure, wherein the nacelle structure is directly connected to the main structure at only three static points, the nacelle shell structure comprising;
    a curved top sub-structure;
    a curved first side sub-structure connected to the curved top sub-structure;
    a curved second side sub-structure connected to the curved top substructure and to the curved first side sub-structure, wherein the curved top sub-structure, the curved first side sub-structure and the curved second side sub-structure form a hollow cylinder;
    an end sub-structure connected to the curved top sub-structure, the curved first side sub-structure and the curved second side sub-structure, wherein the end sub-structure closes one end of the hollow cylinder;
    a lock-labyrinth for positioning between a rotating part with a rotation axis and a stationary part of the wind turbine, comprising;
    a shield structure;
    a support structure;
    wherein the shield structure is located radially outward of the support structure and protruding the support structure in an axial direction, and
    wherein the shield structure comprises a nose protruding radially inward and being located at an axial position where the support structure forms a U shaped water-tight channel that opens radially outwards of the support structure; and
    further comprising a gap between the rotating part and the stationary part, wherein water or dirt entering the gap is led into the water-tight channel by the nose.

* * * * *